United States Patent [19]

Herrlander

[11] Patent Number: 4,472,181
[45] Date of Patent: Sep. 18, 1984

[54] SPRAY PAINTING PLANT CONTAINING APPARATUS FOR PURIFYING CONTAMINATED AIR

[75] Inventor: Bo Herrlander, Växjö, Sweden

[73] Assignee: AB Svenska Fläktfabriken, Nacka, Sweden

[21] Appl. No.: 368,411

[22] Filed: Apr. 14, 1982

[30] Foreign Application Priority Data

May 8, 1981 [SE] Sweden .................. 8102901

[51] Int. Cl.$^3$ ........................................... B01D 47/02
[52] U.S. Cl. ............................................. 55/228; 55/85;
55/89; 55/229; 55/DIG. 46; 98/115 SB;
118/DIG. 7; 210/151; 210/195.1; 210/202;
210/617
[58] Field of Search ............... 55/85, 89, 95, 228,
55/DIG. 46, 229; 210/608, 617, 618, 150, 151,
188, 195.1, 202, 221.2; 98/115 SB; 118/DIG. 7

[56] References Cited

U.S. PATENT DOCUMENTS

| | | | |
|---|---|---|---|
| 2,258,398 | 10/1941 | Ward | 210/617 |
| 2,642,394 | 6/1953 | Pavlett et al. | 210/617 |
| 3,232,434 | 2/1966 | Albersmeyer | 210/617 |
| 3,396,514 | 8/1968 | Hurst et al. | 210/195.1 |
| 3,713,543 | 1/1973 | Heaney | 210/202 |
| 4,008,056 | 2/1977 | Potter | 55/85 |
| 4,092,242 | 5/1978 | Deane | 210/221.2 |
| 4,100,066 | 7/1978 | Bloomer et al. | 210/195.1 |
| 4,200,524 | 4/1980 | Levin | 210/618 |
| 4,213,864 | 7/1980 | Asikainen | 210/151 |
| 4,279,754 | 7/1981 | Pollock | 210/608 |
| 4,340,484 | 7/1982 | Pollock et al. | 210/608 |

FOREIGN PATENT DOCUMENTS

| | | | |
|---|---|---|---|
| 2547675 | 5/1977 | Fed. Rep. of Germany | 55/85 |
| 29325 | 3/1976 | Japan | 210/195.1 |
| 106678 | 9/1976 | Japan | 55/85 |
| 47701 | 1/1977 | Japan | 210/195.1 |
| 47807 | 7/1978 | Japan | 210/151 |

Primary Examiner—David L. Lacey
Attorney, Agent, or Firm—Oblon, Fisher, Spivak, McClelland & Maier

[57] ABSTRACT

In a plant for purifying contaminated air, the contaminants are transferred from the air to a liquid flowing through a spray booth through which the contaminated air also flows in intimate contact with the liquid. The liquid is then collected in a container, from which it is recirculated to the spray booth. The closed liquid circulation circuit in flow communication with the spray booth is connected to a biological cleaning step in which the contaminants dissolved and/or suspended in the liquid are decomposed and then separated. The biological cleaning step comprises a bioreactor in which the main portion of the bio-degradation occurs, and a separator, for separation of the biosludge coming from the reactor. At least part of the contaminated liquid passing through the spray booth is continuously transferred to the biological cleaning stage from which substantially the same quantity of the cleaned liquid is recirculated to the spray booth circulation circuit.

5 Claims, 7 Drawing Figures

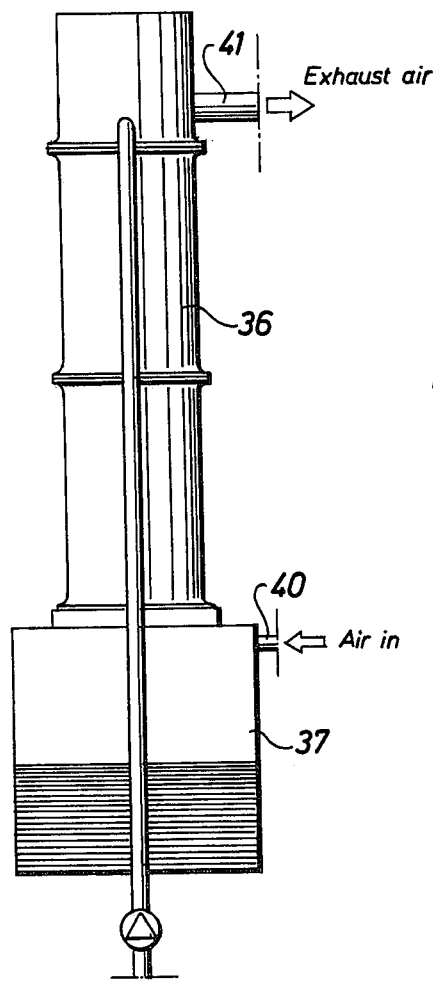 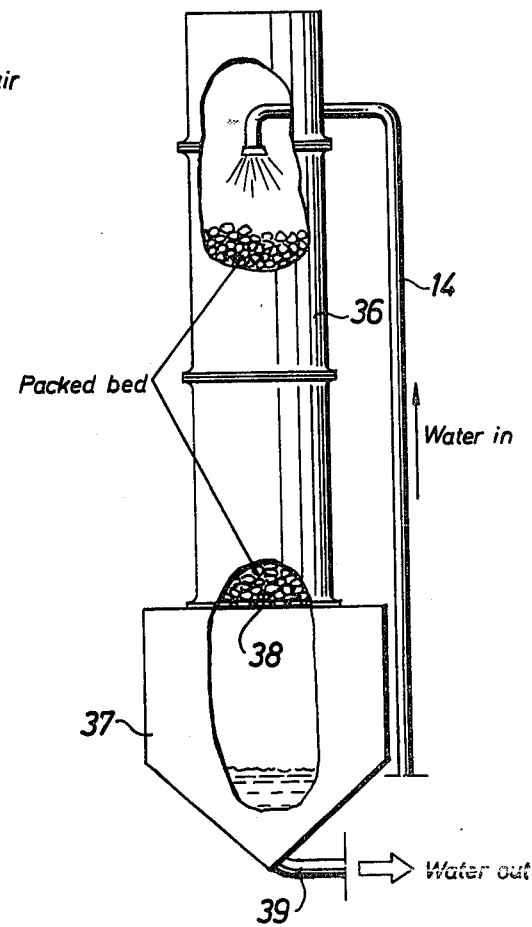

SPRAY PAINTING PLANT CONTAINING APPARATUS FOR PURIFYING CONTAMINATED AIR

BACKGROUND OF THE INVENTION

1. Field of the Invention

The present invention relates to a plant for purifying contaminated air in which the impurities are transferred from the air to a liquid in a spray booth through which the contaminated air is caused to pass in intimate contact with the liquid which also flows through the same booth, the liquid being collected in a container from which it is recirculated to the spray booth.

2. Description of the Prior Art

The utilization of a spray booth is well known, for instance, in spray painting, the object to be painted is placed so that the excess paint will accompany an air stream through the booth. In the booth, the excess paint is brought into intimate contact with a liquid, wherein pigment and solvent contained in the paint are absorbed by said liquid, thus purifying the remaining air.

The liquid flowing through the spray booth is usually water which circulates in a closed system. Since the hydrocarbon-based solvents present in paints have limited solubilities in water, a saturation limit will very soon be reached. As a result thereof, the hydrocarbon concentration in the air which has passed through the spray booth will be unacceptably high. It has long been recognized that the exposure of people to this atmosphere in a room where spray painting is in progress may represent a health hazard.

In the United States for instance, hydrocarbon emission regulations have been imposed by federal, state and local governments. Inter alia, these emission regulations require a hydrocarbon emission reduction of approximately 80% in painting with specific laquer topcoat paints. This goal may be reached by combining different measures to obtain the desired effect. Such measures include the use of other less harmful paints and the introduction of changes in the painting process. The changes include utilizing electrostatic painting and adding hydrocarbon emission abatement systems after the painting station.

Large and expensive abatement systems have been installed to purify the solvent-contaminated air coming out from the spray booth. These systems work by passing the air through a purifying plant containing activated carbon or some kind of scrubber in which the solvents from the spray booth are washed out.

According to another type of air purification, the solvent-contaminated air is passed through an incineration oven or some other kind of heating arrangement where the poisonous airborne hydrocarbon compounds are burnt.

In the prior art there are examples of plants for purifying air, such as the one described in the German Patent DE-B No. 25 47 675. The plant in this patent employs a scrubber where the circulating scrubbing liquid is exposed to a biological purification stage. However, using such a plant for purifying the exhaust air coming out from a scrubber, would be extremely costly, since the plant must be dimensioned for the greater quantities of air which flow through a spray booth. In practice therefore, the problem has not been solved in this way due to the high costs involved.

Consequently, it has hitherto not been possible to solve both the economical and the practical problems which are associated with the emission of hydrocarbons contained in spray booth air. Moreover, those systems which have presented practical solutions to the problem, have not met the minimum emission regulations which the authorities have imposed and which already need be met by the middle of this decade.

Accordingly, there still remains the need for a system to purify contaminated air flowing in intimate contact with a liquid, which system meets minimum emission regulations while being practical and economically feasible.

SUMMARY OF THE INVENTION

Accordingly, it is an object of the present invention to provide a plant which presents a practical solution to purifying spray booth air and meets the demands for a good working environment as well as being economical enough to be useful in the manufacture of painted products at a price which is commercially viable.

This object is substantially realized according to the present invention by providing a biological purification stage in which dissolved and/or suspended contaminations in a liquid may be biodegraded or broken down and are then separated. The biological purification stage comprises, at least one bioreactor in which the main part of the biological bio-degradation takes place, and a separator means for the separation of the biosludge coming out of the bioreactor.

According to the invention, a spray booth included in a paint spraying plant is, in addition, utilized for the collection of paint particles and for the absorption of solvents which are effected by continuous cleaning of the circulating liquid. As a result, the liquid is kept under its saturation limit for these solvents all the time.

Having generally described the invention, a more complete understanding can be obtained by reference to the drawings which are provided herein for purposes of illustration only, and are not intended to be limited unless otherwise specified.

BRIEF DESCRIPTION OF THE DRAWINGS

FIGS. 4A and 4B are views of a biological tower forming part of a plant according to FIG. 1 or FIG. 2;

Other objects, advantages and features of the present invention will become apparent to those skilled in the art from the following discussion.

DETAILED DESCRIPTION OF THE PREFERRED EMBODIMENTS

In a suitable embodiment of a plant according to the present invention at least a portion of the contaminated liquid from the spray booth is channeled via the biological purification stage, from which substantially the same portion of cleaned liquid is returned to the closed circulation of the liquid through the spray booth.

In another embodiment of the present invention, the container and the separator may form one unit which is included in both the spray booth liquid circulation circuit and the biological purification stage.

A further embodiment of the plant according to the invention is intended for use in spray painting booths, where the biological purification stage is intended for cleaning water in which different substances such as solvents, binding agents and colouring pigments are dissolved or suspended.

Figure 1:
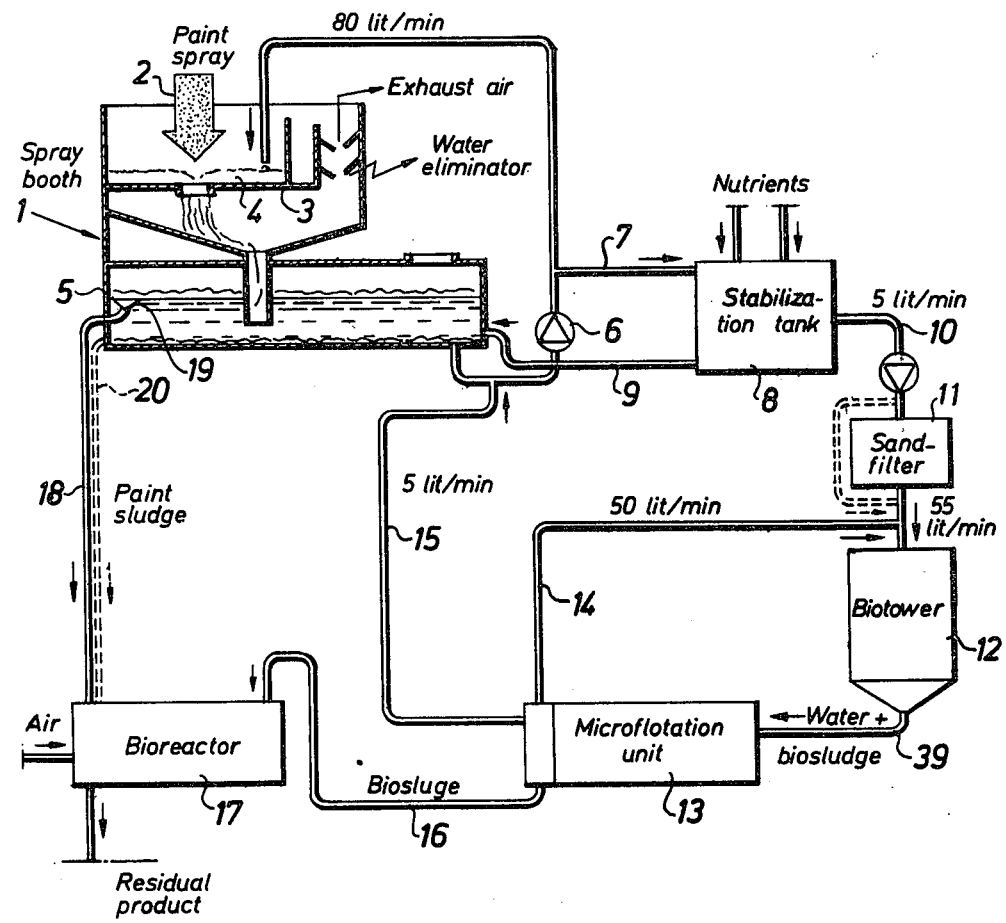
FIG. 1 illustrates a plant for spray painting where only part of the contaiminated water in the closed circuit of the spray booth is processed via the biological stage.
Figure 2:
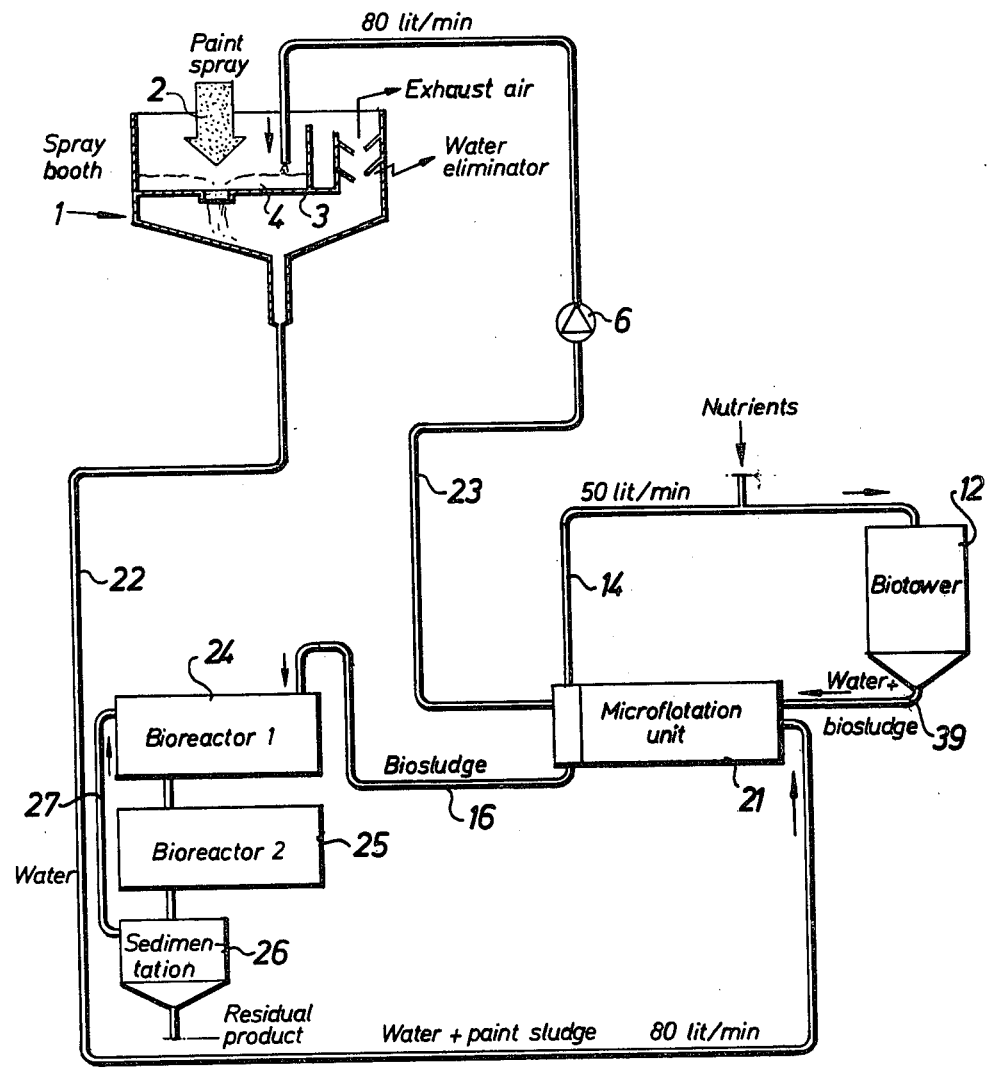
FIG. 2 illustrates an alternative embodiment of a plant for spray painting in which the container and the separator form a single unit.

The plant circuit according to FIG. 1 includes a spray booth (1) intended for use in spray painting objects in a way which is described more in detail in connection with FIG. 2. Fans (not shown) or other air pressurizing means generate an air stream through the spray booth, causing the air (2) contaminated with paint particles to enter the upper part (3) of the spray booth. It is here that the air is brought into intimate contact with a liquid (4) which also flows through the spray booth. The liquid is preferably water. The thus contaminated water is then collected in a container (5), which is arranged in the lower portion of the spray booth, and the water in the container is then recirculated to the upper part (3) of the spray booth via a conduit by a pressure generating means, such as pump (6).

In accordance with the invention, part of the contaminated water circulating through the spray booth is transferred to a biological purification stage. The water is thus, first taken via a conduit (7) to a stabilization tank (8) where nutrients are added. As is known in the art, these nutrients may comprise nitrogen and phosphorous compounds, such as ammonium hydroxide ($NH_4OH$) and phosphoric acid. The nutrients are supplied batchwise to the stabilization tank and in proportion to the paint concentration in the air. The tank is kept filled and the excess liquid is returned to the container (5) in the spray booth through a conduit (9) connected with the container. A minor amount of liquid departs from the tank via a conduit (10) connected to a sand filter (11).

The water passes from top to bottom through the filter and the particles suspended therein are separated from the solvent-laden water in the sand filter which preferably comprises a pressure chamber filled with sand of suitable grain size. Two filters are preferably used for alternate connection into the circuit, so that one filter can be in operation, while the other is cleaned by means of water and pressurized air, which are caused to flow backwards through the filter.

From the filter, the liquid flows into a bioreactor, preferably in the form of a biotower. This tower contains a filler material on which microorganisms are grown. The total efficiency of the tower may be substantially increased by moderating pH-value and temperature, as well as the concentration of the solvents and nutrients. The changes in these influencial factors may be effected in a separation unit placed after the biotower in the closed liquid purification circuit. Other reactors could be used instead of a biotower i.e., as known in the art a fluidized bed or an activated sludge tank can be employed.

The separation unit is represented in the form of a microflotation unit (13) receiving water from the bottom of the tower via a conduit (39) and delivering the treated water by continuously recirculation via a conduit (14) to the top of the tower. In the microflotation unit (13) the dead microorganisms are separated from the water coming from the biotower and the cleaned water is sent back to the container (5) via a conduit (15).

The separated biosludge then flows from the microflotation unit (13), through a further conduit (16), to another bioreactor (17), to which the paint sludge separated in the container (5) is also supplied through a separate conduit (18).

The bioreactor (17) is in this case an activated sludge tank, which means that air must be supplied to the tank for accomplishing aerobic degradation. The conduit (18) carrying the paint sludge from the container (5) to the bioreactor (17), is connected to a surface separator (19) in the container (5), and this separator can also be combined with a bottom separator (not shown) from which the paint sludge is supplied through a conduit (20) to the bioreactor (17). The residual sludge is finally discharged from the bioreactor to a recovery plant. The bioreactor (17) can naturally also take the form of a passive sludge bed such as a digestion tank in which the final degradation of organic material occurs anaerobically.

FIG. 2 shows an alternative embodiment of a spray painting plant where a container (5) and a separator (13) according to FIG. 1 are arranged in a single unit (21) which is consequently part of the spray booth liquid circulation circuit and the biological purification stage. The contaminated liquid from the spray booth (1) is supplied through a conduit (22) directly to the separator, which is in the form of a microflotation unit (21) in this embodiment, as well. The same quantity of liquid taken from the spray booth through this conduit (22) is tapped out from the microflotation unit (21) and recirculated to the spray booth (1) through a conduit (23) by means of a pump (6). The microflotation unit (21) and the biotower (12) have a separate liquid circulation circuit, similar to that described in connection with FIG. 1, via two conduits (14) and (39) connected to both, the liquid thus being taken from the separator (21) to the top of the biotower (12) and from its bottom back to the separator.

The nutrients which are necessary for the biological purification, are supplied in this embodiment to the liquid which is recirculated via conduit (14) to the top of the biotower. The separator (or microflotation unit 21) is consequently given here the double function of separating the impurities suspended in the spray booth liquid, and also the biosludge coming from the biotower. The biosludge is then transferred via conduit (16) to the bioreactor section. In this plant there are two bioreactors (24 and 25) connected in series, both being of the activated sludge type. The first reactor (Bioreactor 1) is connected to the microflotation unit (21) and to the second bioreactor (Bioreactor 2) via separate conduits. The second bioreactor (B2) is connected to the first bioreactor (B2) and to a sedimentation tank (26). Water and sludge from the second reactor (25) are supplied to a sedimentation tank (26), from which cleaned water is recirculated to the first reactor (24) via a conduit (27).

Figure 3:
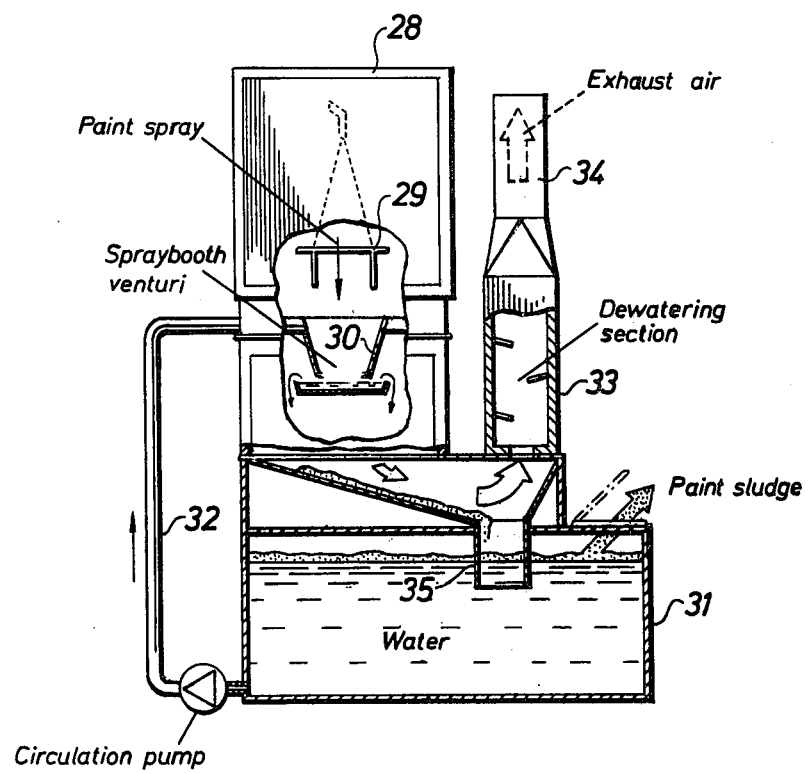
FIG. 3 illustrates in more detail the spray booth intended to form a part of the plant according to FIG. 1.

FIG. 3 shows an embodiment of a spray booth for spray painting, having a container for collecting the spray booth liquid which circulates between the spray booth and the container. The object to be painted (29) is placed in the upper portion of the spray booth (28). The air contaiminated with paint is caused to flow through a venturi (30) in which this air and the liquid are intimately mixed so that the paint particles and the solvent are transferred from the air to the liquid.

The liquid, in this case water, is circulated from the container (31) through the conduit (32) and through the venturi (30). After the venturi, the liquid now laden with paint particles and solvent is separated from the air in a dewatering section (33) from which the liquid is caused to flow back to the container (31), while the air departs through an exhaust duct (34). The paint sludge in the container (31) floats on the surface where it can easily be removed by means of a skimming device as is indicated in FIG. 1. Gaseous solvent is prevented from being entrained in the air stream from the spray booth by means of a water trap (35).

FIGS. 4A and 4B show the biotower (36) in two sideviews, one partly sectioned. The tower contains a filling material acting as the matrix for bacterial growth and action. The tower is placed on a settling tank (37) and the filling material is supported by the stainless steel grid (38) arranged in the tank cover. Water is supplied to the top of the biotower through a conduit (14), where it is freely distributed over the packing. During the downward migration of the water the solvent is absorbed and metabolized in the layer of microorganisms covering the packing material. The water is then collected in the tank (37) and is supplied to the microflotation unit through a conduit (39). Air is supplied through a lower duct (40) and is drawn through the tower from bottom to top in counter flow to the water flow and led away through an upper duct (41).

Figure 5:
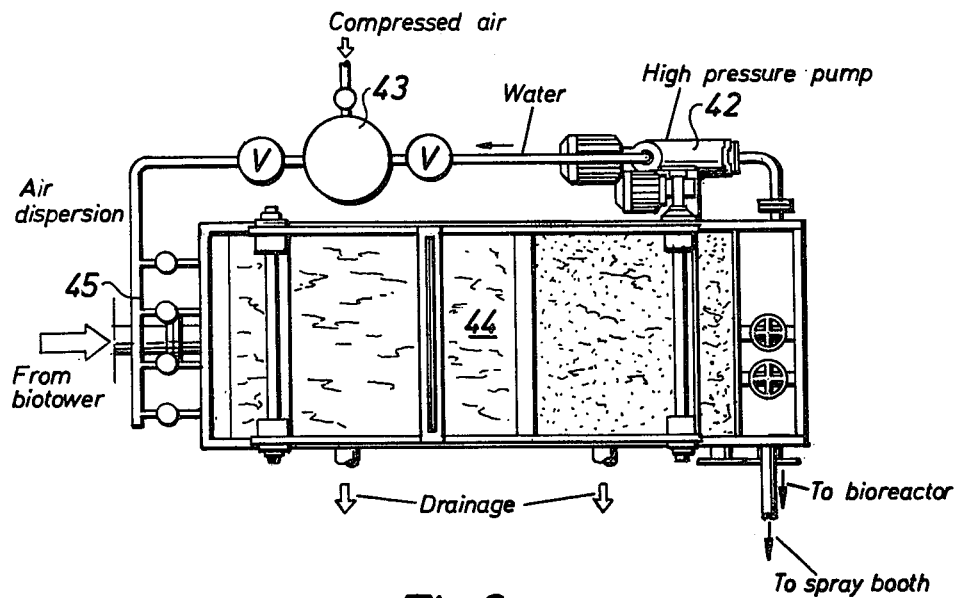
FIGS. 5 and 6 are views of a microflotation unit from above and laterally, respectively, forming part of a plant according to FIG. 1 or FIG. 2.
Figure 6:
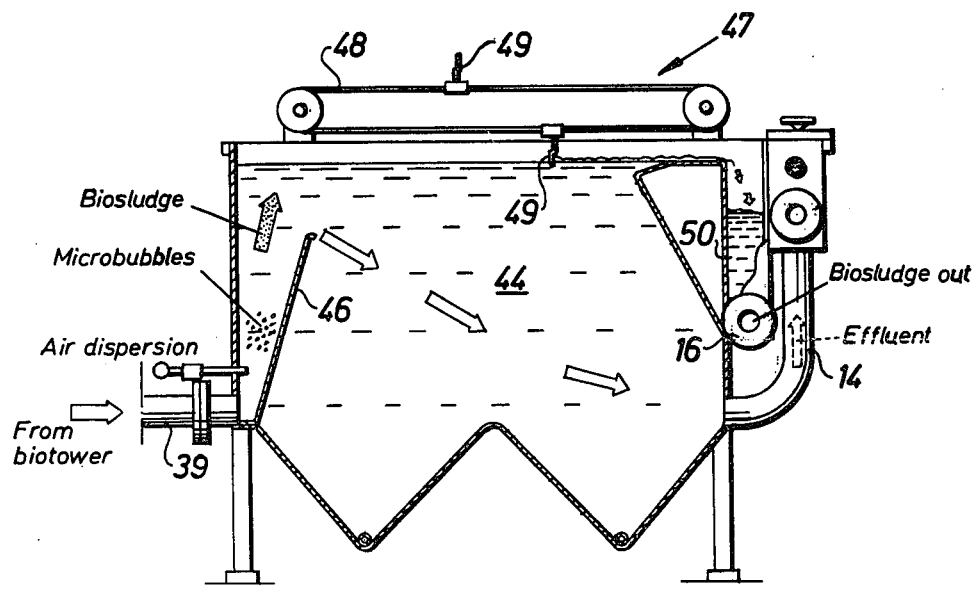

The microflotation unit is shown in FIG. 5 from above and in a sectioned sideview in FIG. 6. In the microflotation unit dead organisms are separated from the water coming from the tank (37) of the biotower (36). A minor portion of the cleaned water is pressurized by means of a high-pressure pump (42), and is then saturated with compressed air in a pressure tank (43). At this high pressure the water is capable of dissolving 80-100 ml of air per liter of water. This pressurized water is then expanded in a tank (44) to which the overflow conduit (39) from the biotower is also connected. This process is performed such that the air dispersion is transported through a conduit (45) which also serves to distribute air and introduce it into the lower portion of the expansion tank (44), to which the biosludge from the biotower is supplied via the conduit (39). A baffle plate (46) will force the incoming flow of fluid upwards, in order to mix it with the pressurized water expanding in the container.

Due to the pressure release, microscopic air bubbles are formed which become attached to the suspended solids causing them to float to the surface. The solids, which are dead microorganisms, can be removed by means of a skimmer or a scraping device (47), as shown in FIG. 6, comprising an endless chain (48) with two scraping members (49), for removing the pollutants or the biosludge floating on the surface. The biosludge is transferred to a smaller tank (50) located next to the main tank (44), while the cleaned water is recirculated both to the top of the biotower and to the circulation system passing through the spray booth, as indicated in FIGS. 1 and 2. The biosludge is then transferred to the bioreactor section via a conduit (16), for final degradation.

In order to further illustrate the present invention the following examples are presented. The specific conditions and proportions in these examples are presented as being typical only and should not be construed to limit the scope of the present invention unduly.

EXAMPLES

Example 1

In a plant according to FIG. 1, water at 80 l/min and air at 0.5 m$^3$/sec are caused to flow through a spray booth which is shown in detail in FIG. 3.

A paint killer TEXO LP 781 is introduced into the water circulating through the spray booth 1 in such quantity that the pH-value is about 8. The paint killer makes the paint non-sticky in the water so that it does not stick to the apparatus. The effect of the paint killer decreases at a pH below 8.

The water in the spray booth assumes approximately the temperature of wet air, in this case about 12°-15° C. The pressure drop over the spray booth venturi is about 130-140 mm water column.

A paint according to Table 1 is sprayed in the booth at a rate of 2-2.5 kg/h for 5-7 hours daily. Of the total amount of solvents present in the paint about two thirds by weight are separated such that about one third is absorbed in the spray booth water and another third is trapped in the paint sludge. The paint sludge is removed as required, by skimming the surface in the tank as indicated in FIG. 1. A partial flow of about 5 l/minute of spray booth water is supplied to the biotower (12) via the stabilization tank (8) and the sand filter (11). Nutrients, substantially nitrogen in the form of ammonium hydroxide and phosphorous in the form of phosphoric acid are added in the stabilization tank (8). Ammonium hydroxide is added to the extent of 60 ml per kg sprayed paint and phosphoric acid to the extent of 4 ml per kg sprayed paint.

The biotower (36) is shown in detail in FIGS. 4A and 4B and has a filler of the type known as "Norton Actifil 90 ®". A biomass consisting of a bacterial culture grows on the filler. This culture was taken from a municipal sewage plant and the species of microorganisms grown on the filler are shown in Table 2. The microorganisms collected from the sewage plant have to become acclimatized to their new environment before any considerable biodegradation can occur. The water was distributed over the filler to an amount of about 50-55 liters/min and was then collected at the bottom of the tower together with the biosludge removed from the filler material. Ambient air was sucked through the tower from the bottom to the top to oxygenate the water and the microorganisms. The solvents absorbed in the spray booth water are degraded in the biotower. The degradation releases heat which makes the temperature in the biotower water some degrees higher than that in the spray booth. A suitable pH-value in the biotower is between 6-9, which means that in this experiment the spray booth water had a correct pH. If this were not the case the pH-value could have been adjusted by adding sulfuric acid or caustic soda.

The water with biosludge from the biotower is supplied to a microflotation unit (13) of the type shown in FIGS. 5 and 6, where the biosludge is separated after the water is pumped to the top of the tower (12). The microflotation unit is of the "dissolved air" type, i.e. a minor portion of the cleaned water is pressurized in a tank to 4-6 bar by means of compressed air. The pressurized water is mixed with non-pressurized water coming into the flotation plant. The sudden pressure decrease of the previously pressurized water creates microscopic air bubbles which adhere to the suspended solids, such as dead microorganisms, which then float to the surface where they are skimmed off at intervals and collected in a special tank included in the plant.

The same amount of water, 5 liters/min, which is supplied to the biotower (12) is also fed back to the spray booth (1) from the microflotation unit (13).

The water which evaporates from the spray booth as well as from the biotower is replenished by a daily addition of about 120-130 liters of water. The water system contains about 4000 liters in total, with the spray booth containing about 800 liters.

During spray painting the concentration of solvent in the water will increase and after the spraying operation it will decrease to its initial values, as a result of the biological degradation in the bioreactor.

The solvent concentration is most easily measured with a TOC-instrument (TOC=Total Organic Carbon) and in this case a Beckman 915 TOC is used.

The results show that for a quantity of about 12-13 kg paint sprayed per day, about 6 kg of solvent will be separated, and thereof 3 kg per 24 hours will be degraded in the bioreactor.

Example 2

In a plant according to FIG. 2 the water from the spray booth is fed directly into a microflotation plant as that shown in FIGS. 5 and 6. Cleaned water from the microflotation unit (21) is recirculated to the spray booth (1). Water from the biotower (12) is also supplied to the microflotation unit and clean water from the plant is recirculated to the top of said biotower. Paint sludge and biosludge are consequently separated simultaneously. The sludge is treated in two bioreactors (24) and (25) connected in series.

The 12-13 kg of paint sprayed during a day according to Example 1 yield about 4-5 kg of dry substance together with about 3 kg of solvent contained in a sludge cake having about 50% water content. This sludge cake is transferred to the two bioreactors (24) and (25) which are connected in series and are of the activated sludge type. The first bioreactor, which the sludge cake enters first, comprises a container with a volume of about 300 liters. The container is ventilated with air at a pressure of about 1 bar. The ventilation causes mixing and oxygenation. The concentration of the paint sludge will be decreased by the addition of water of about 5% dry substance.

Nitrogen in the form of ammonia, and phosphorous in the form of phosphoric acid, are also added. This is, of course, not necessary if sufficient nutrients are supplied in some other way.

Sludge and water are transferred to the second reactor via an overflow. The second reactor has a volume of about 250 liters and is likewise ventilated. Water and sludge from this second reactor are finally led to a sedimentation tank (26). A mixture of paint sludge and biosludge, to a quantity of about 3.2-3.6 kg per 24 hours with an about 50% water content, comes from the bottom of the sedimentation tank.

Cleaned water from the overflow is recirculated to the first reactor to decrease the concentration of inflowing sludge.

The biodegradation occurs with the aid of the cultivation described in Example 1. If the spray booth is connected in accordance with Example 1 no further grafting of bacteria is necessary since there are enough bacteria in the water. A suitable pH-value is 6-9, which means that the spray booth water described in Example 1 maintains the right value. The temperature will be about the same as that of the spray booth water.

The results here show that about 3 kg of solvent contained in the paint sludge and part of the paint binder have been broken down.

TABLE 1

Solvent in 27% LDL-laquer
Reduced paint system consisting of 80% by volume of paint 397 YAJ 615 and 20% by volume of thinner 38228.
Dry solids content: 32% by weight

| Component | % by volume | % by wt. | Density kg/liter | Solubility in water g/100 ml at 20° C. |
|---|---|---|---|---|
| MEK | 3 | 2.8 | 0.805 | 27.0 |
| P-naphtha | 10 | 7.7 | 0.660 | 0.01 |
| VM & P naphtha | 1 | 0.8 | 0.70 | 0.01 |
| Toluene | 6 | 6.1 | 0.867 | 0.05 |
| Cellulose acetate | 1 | 1.1 | 0.975 | 22.0 |
| Mineral spirits (180-210° C.) | 41 | 36.8 | 0.77 | 0.01 |
| Solvesso 150 | 9 | 9.4 | 0.890 | 0.05 |
| Butyl cellosolve-acetate | 9 | 9.5 | 0.9 | 1.1 |
| DBE-2 | 10 | 12.7 | 1.086 | 4.5 |
| Diethyl phtalate | 10 | 13.1 | 1.123 | insoluble |

TABLE 2

| Biotower | |
|---|---|
| Growth on filler material | |
| Good growth of: | Citrobacter freundil |
| | Serratia species |
| | Aeromonas hydrofila |
| Minor growth of: | Streptococcus faecalis |
| | Yeast fungus |
| No thermostabile coliform bacteria or stafylococcus discovered. | |
| Biotower water | |
| Growth of | Concentration (No./ml): |
| Citrobacter freundii | $9 \times 10^5$ |
| Aeromonas hydrofila | $3 \times 10^5$ |
| Serratia species | |
| Staphylococcus aureus | 12 |
| Streptococcus faecalis | 5 |
| Pseudomonas species | 20 |
| Total number of bacteria at 22° C. | $4 \times 10^7$ |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A plant for spray painting and purifying contaminated air, comprising:
 a spray booth having upper and lower portions, a container, a biological purification system comprising a biological reactor and a separator, a stabilization tank, and an aerobic bioreactor, wherein said booth, container, purification system, stabilization tank and aerobic bioreactor are arranged in flow communication with one another;
 said spray booth having means for causing contaminated air to be passed through and in intimate contact with a substantially pure flowing liquid thereby transferring contaminants from said air to said liquid, said spray booth being connected with said container through a first means of communication between said lower spray booth portion and said container, whereby said contaminant containing liquid is transferred to said container;

said container being provided with a second means of communication whereby a portion of said contaminated liquid is passed from said container to said upper spray booth portion, a third means of communication communicating said container and said stabilization tank whereby the remaining portion of said contaminated liquid is transferred to said stabilization tank, and a fourth means of communication communicating said container and said aerobic bioreactor whereby sedimented contaminants in the form of sludge, is transferred to said aerobic bioreactor;

said stabilization tank being further provided with a fifth means of communication whereby a portion of said contaminated liquid is transferred to the biological reactor, and the remaining portion of said contaminated liquid is transferred from said tank to said container, by a sixth means of communication;

said biological reactor, wherein biosludge is produced from said transferred liquid, being provided with a seventh means of communication, whereby said sludge and remaining liquid are transferred to said separator;

said separator wherein said sludge is separated from said liquid, now purified, being provided with an eighth means of communication whereby a part of said purified liquid, is transferred from said separator to the upper portion of said spray booth, a ninth means of communication whereby the remaining portion of said purified liquid is transferred to said biological reactor, and a tenth means of communication whereby the separated biosludge is transferred from said separator to said aerobic biological reactor;

said aerobic bioreactor, being further provided with a sludge discharge means whereby aerobically biodegraded sludge is discharged;

said plant and said flow communication being such that a portion of said liquid flowing between said spray booth and said container is continuously transferred to the biological reactor and then to the separator, and the same quantity of purified liquid is returned therefrom to said spray booth.

2. The plant of claim 1, further comprising means positioned in said container for separating the liquid from sedimenting solid contaminants; said sedimenting contaminants being transferred by the fourth means of communication from the container to said aerobic reactor.

3. The plant of claim 1, wherein said biological reactor is a biotower and the separator is a floatation unit.

4. A plant for spray painting and purifying contaminated air comprising:

a spray booth having lower and upper portions, a separating unit, a first biological purification system comprising a biotower, a second biological purification system comprising at least two aerobic biological reactors, wherein said booth, separating unit, and said first and second biological purification systems are arranged in flow communication with one another;

said spray booth having means for causing contaminated air to be passed through and in intimate contact with a substantially pure flowing liquid, thereby transferring contaminants from said air to said liquid, said spray booth being connected with said separating unit by a first means of communication between said lower portion of said booth and said separating unit;

said separating unit, wherein liquid, is separated from sedimenting sludge, being provided with a second means of communication whereby a portion of said liquid, now purified, is transferred from said unit to the upper portion of said spray booth, and the remaining portion of said purified liquid being transferred from said unit to said biotower by a third means of communication;

said biotower wherein biological sludge is produced from said transferred liquid, being provided with a fourth means of communication, whereby said sludge and the remaining liquid is transferred from said biotower to said separating unit;

said separating unit being further provided with a fifth means of communication, whereby said separated biosludge is transferred from said unit to a first aerobic bioreactor in said second purification system;

said first aerobic bioreactor, wherein said sludge being further biodegraded, is further provided with a sixth means of communication, whereby said degraded sludge and the remaining liquid are transferred from said first reactor to a second reactor of said second purification system;

said second aerobic bioreactor being further provided with a means of discharge whereby said sludge and said remaining liquid is discharged from said second bioreactor;

said plant and said flow communication being such that a portion of said liquid flowing between said spray booth and said separating unit is continuously transferred to the first biological purification system, and essentially the same quantity of purified liquid is returned therefrom to said separating unit and then to the spray booth.

5. The plant of claim 4 wherein the separating unit is a floatation unit.

* * * * *